Jan. 7, 1936.                 D. R. HILLIS                 2,027,171
                            DIVISIONAL FEEDER
                          Filed Jan. 26, 1934                 2 Sheets-Sheet 1
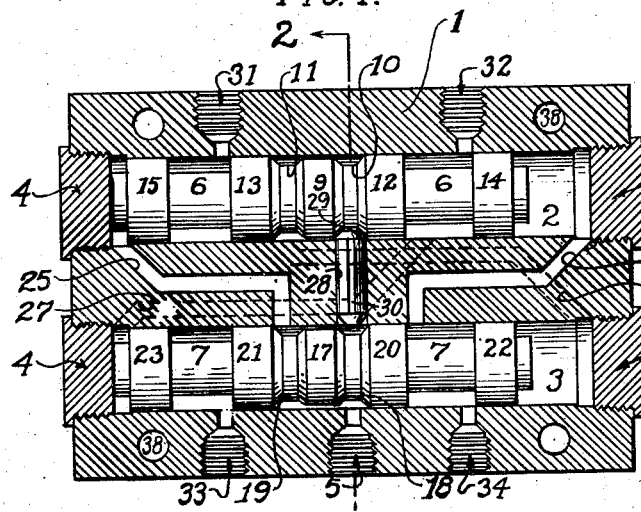
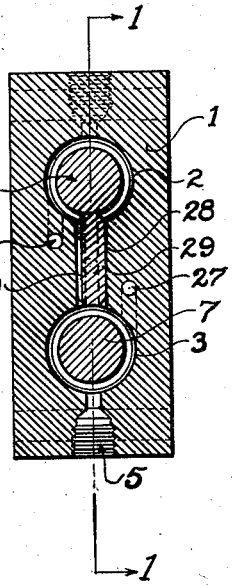
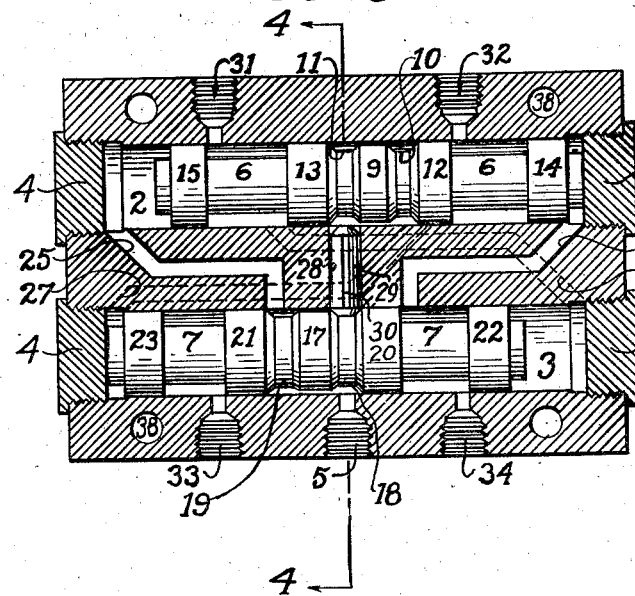
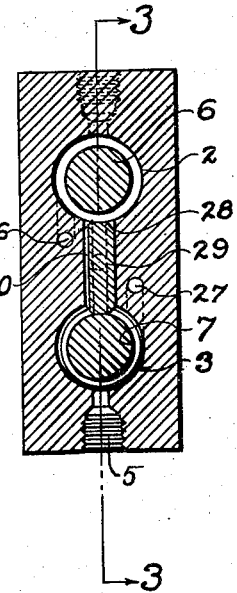
INVENTOR.
David R. Hillis.
BY
ATTORNEYS.

Jan. 7, 1936.   D. R. HILLIS   2,027,171
DIVISIONAL FEEDER
Filed Jan. 26, 1934   2 Sheets-Sheet 2

INVENTOR.
David R. Hillis.
BY
ATTORNEYS.

Patented Jan. 7, 1936

2,027,171

UNITED STATES PATENT OFFICE 2,027,171

DIVISIONAL FEEDER

David R. Hillis, Detroit, Mich., assignor, by mesne assignments, to Trabon Engineering Corporation, Cleveland, Ohio, a corporation of Ohio Application January 26, 1934, Serial No. 708,353

3 Claims. (Cl. 184—7)

REISSUED

The present invention pertains to a divisional feeder for a centralized lubricating system.

Prior to this invention, feeders were provided for use in either single line or dual line centralized lubricating systems but were so designed as to require the lubricant to enter the feeder through first one and then another port or they were so designed as to discharge the lubricant through the same discharge port to the bearing. No feeder that I am aware of was so constructed that lubricant under pressure always entering the feeder through the same inlet port could be discharged alternately and automatically through a plurality of separate ports.

The main object of my invention is the provision of a feeder which will always receive lubricant through the same inlet port and will discharge it automatically and alternately through one and then another of a plurality of separate ports.

A further object of my invention is the provision of a divisional feeder which is simple and cheap to manufacture and is durable.

A further object of my invention is the provision of means in such a feeder which will prevent the pistons from becoming inoperative due to stopping on dead center.

These and other objects auxiliary thereto will appear from the following description of my invention and more particularly pointed out in the appended claims, reference being had to the drawings in which:

Figure 1 is a sectional view of a feeder taken on line 1—1 of Fig. 2 showing two piston rods in their extreme left position.

Fig. 2 is a cross section taken on line 2—2 of Fig. 1.

Fig. 3 is a section taken on line 3—3 of Fig. 4 showing the upper piston rod at the extreme right position and the lower one in its extreme left position.

Fig. 4 is a section taken on line 4—4 of Fig. 3.

Figure 5:
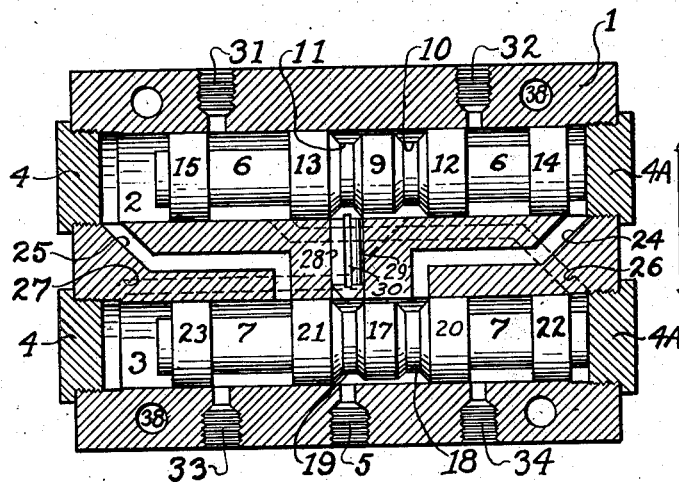
Fig. 5 is a section taken on line 1—1 of Fig. 2 showing both piston rods at their extreme right position.

In the drawings, the numeral 1 represents the body of the feeder which is suitably bored to form cylinders 2 and 3 respectively, the ends of which are closed with plugs 4 and 4a. The feeder is provided with an inlet port 5 opening into the central portion of the cylinder 3.

Each cylinder is provided with a piston rod having a plurality of pistons or piston valves, the piston rod in cylinder 2 being designated by the numeral 6 and the piston rod in cylinder 3 being designated by the numeral 7.

The central portion of the piston rod 6 has an enlarged hub 9 with bevel edged grooves 10 and 11 on either side, all for a purpose hereinafter to be designated. Next to the grooves 10 and 11 are the inner pistons 12 and 13. Located near the ends of piston rod 6 are the outer pistons 14 and 15.

Similarly, piston rod 7 has an enlarged hub 17 with bevel edged grooves 18 and 19 on either side. Next to the grooves 18 and 19 are the inner pistons 20 and 21. Located near the ends of piston rod 7 are the outer pistons 22 and 23.

The ends of both piston rods 6 and 7 project beyond the outer pistons so as to prevent the closing of the openings of the ducts in both ends of the cylinders 2 and 3.

From the ends of cylinder 2 are ducts 24 and 25 connecting to intermediate sections of cylinder 3 and ducts 26 and 27 from the ends of cylinder 3 to intermediate sections of cylinder 2.

I provide a cylindrical passage 28 between cylinders 2 and 3 in which is located a cylindrical stop 29 having beveled ends and with a small by-pass groove 30 along one side.

This stop member 29 acts in conjunction with the hubs 9 and 17 and the adjacent grooves of the respective piston rods in forming a governing device which prevents the piston rods from moving at the same time, thereby avoiding failure of operation which might otherwise result if the fluid pressure should be discontinued while the piston rods were passing dead center.

The stop member is not intended to block the passage 28, but, on the contrary, it is to be made in any manner which will permit fluid to flow through the central passage directly or through the stop member itself from one cylinder to the other, hence it may be pierced either through its center or on its side as shown, or it may be made in spider form, but it must be of a length greater than that of the passageway 28, so that it may reach into the groove of a piston in one cylinder while contacting the hub of the piston in the other cylinder, and vice versa.

My divisional feeder will operate without the stop member, but it is not as efficient, since the piston rods sometimes stop on dead center when the pressure pump or other power means stops, and when the power means is again started, the feeder will not operate until at least one plug is removed and a piston valve adjusted, unless as sometimes happens, a sudden jar displaces one piston valve from dead center.

Numerals 31, 32, 33 and 34 indicate the four discharge ports, discharge port 31 being located in cylinder 2 in such a manner as to always communicate with that portion of the cylinder 2 which is between the pistons 13 and 15 regardless of their location, and the other discharge ports being located in similar relationship to the respective adjacent pistons.

Numeral 38 indicates holes used for mounting or fastening the feeder body to any convenient support.

Figure 7:
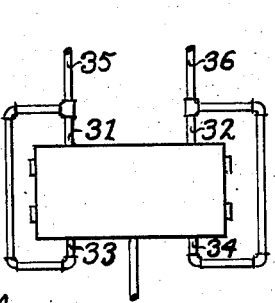
Fig. 7 is a sketch of the standard type of feeder showing pipe connections for changing it into a two outlet feeder.

In the case of Fig. 7, discharge ports 31 and 33 are connected together and 32 and 34 likewise, thereby making two discharge outlets 35 and 36. Piping connections are indicated here but suitable passages through the feeder body may be drilled or otherwise provided to connect discharge ports 31 and 33 into one outlet 35 and ports 32 and 34 into one outlet 36.

Figure 8:
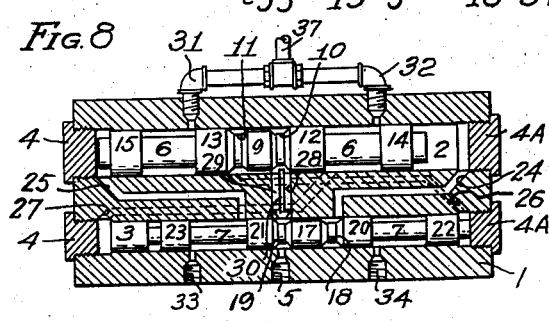
Fig. 8 is section taken on a plane through the center of the two cylinders showing a modified form of my invention by which a three outlet feeder may be provided.

In Fig. 8, discharge ports 31 and 32 are connected to form one outlet 37. This is here indicated with piping but passages may otherwise be provided through the feeder body.

Cylinder 3 of Fig. 8 is constructed with a cross sectional area equal to one-half that of cylinder 2. Thus the amount of lubricant discharged from the discharge ports 31 and 32 through the one outlet 37 is equal to the amount discharged from cylinder 2 by each of the discharge ports 33 and 34.

The operation of the standard divisional feeder as shown in Figs. 1 to 6 inclusive is as follows: Assuming that the feeder has been filled with lubricant and that the moving parts are located at the start of operation as indicated in Fig. 1, lubricant under pressure enters inlet port 5 and passes into cylinder 3, around groove 18, across enlarged hub 17, around groove 19, through duct 25 into cylinder 2, and thereby forces piston rod 6 to move to the opposite end of the cylinder 2. This causes lubricant to be forced from cylinder 2, through duct 24 into cylinder 3, across piston rod 7, between pistons 20 and 22 and it is discharged through outlet port 34. The amount of lubricant discharged is dependent upon the area of the piston 14 and the length of the stroke of piston rod 6, and the discharge stops when the piston rod contacts plug 4a.

During the movement of piston rod 6, piston rod 7 has been held immovable against plug 4 of cylinder 3, due to the pressure of the lubricant in cylinder 3 being communicated through passage 30 of cylindrical stop 29 and around groove 10, across enlarged hub 9, around groove 11, through duct 26 into cylinder 3. This holds piston rod 7 against its plug 4 and it cannot move until the movement of piston rod 6 causes cylindrical stop 29 to move into groove 18 of piston rod 7 since the stop 29 is of such a length as to prohibit both piston rods from moving at the same time. Hence piston rod 7 cannot move until piston rod 6 reaches the end of its stroke.

All parts are now located in the position shown in Fig. 3. The lubricant enters through inlet port 5, passes into cylinder 3, around groove 18, through passage 30 on cylindrical stop 29, into cylinder 2, around groove 11, across enlarged hub 9, around groove 10, through duct 27 into cylinder 3, thus forcing piston rod 7 to move to the opposite end of cylinder 3. This causes lubricant to be forced from cylinder 3 through duct 26 into cylinder 2, across piston rod 6 and discharged through outlet port 31.

During the movement of piston rod 7, piston rod 6 has been held immovable against plug 4a of cylinder 2, due to the pressure of the lubricant in cylinder 3, which is communicated through duct 25 into cylinder 2. This holds piston rod 6 against plug 4a until piston rod 7 reaches the end of its stroke.

All parts are now in the position shown in Fig. 5. The lubricant entering through inlet port 5 passes into cylinder 3 around groove 19, across enlarged hub 17, around groove 18, through duct 24 into cylinder 2 and thereby forces piston rod 6 to move to the opposite end of cylinder 2. This causes lubricant to be forced from cylinder 2 through duct 25 into cylinder 3, across piston rod 7, between pistons 21 and 23 and to be discharged through outlet port 33.

During the movement of piston rod 6, piston rod 7 has been held immovable against plug 4a of cylinder 3 due to the pressure of the lubricant in cylinder 3 being communicated through passage 30 of cylindrical stop 29 and around groove 11, across enlarged hub 9, around groove 10, through duct 27 into cylinder 3. This holds piston rod 7 against plug 4a until piston rod 6 reaches the end of its stroke.

Figure 6:
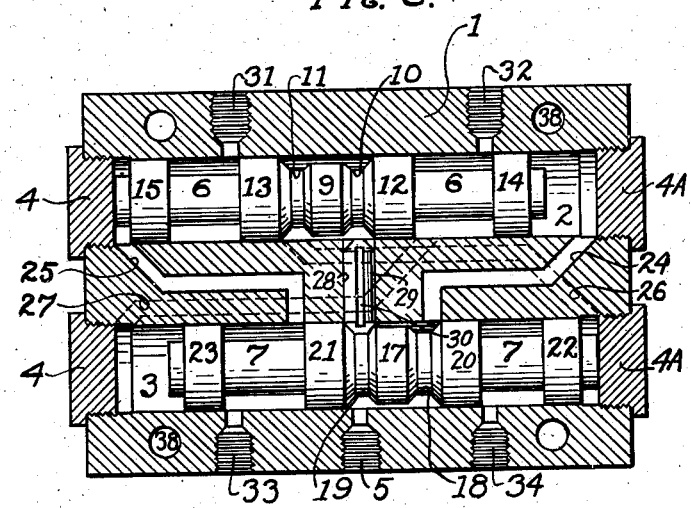
Fig. 6 is a section taken on line 3—3 of Fig. 4 showing the upper piston at its extreme left position and the lower piston at its extreme right position.

All parts are now located as shown in Fig. 6. The lubricant, entering through inlet port 5, passes into cylinder 3, around groove 19, through passage 30 on cylindrical stop 29 into cylinder 2, around groove 10, across enlarged hub 9, around groove 11, through duct 26 into cylinder 3, thus forcing piston rod 7 to move to the opposite end of cylinder 3. This causes lubricant to be forced from cylinder 3 through duct 27 into cylinder 2, across piston rod 6 and discharged through outlet port 32.

During the movement of piston rod 7, piston rod 6 has been held immovable against plug 4 of cylinder 2, due to the pressure of the lubricant in cylinder 3 which is communicated through duct 24 into cylinder 2. This holds piston rod 6 against plug 4 until piston rod 7 reaches the end of its stroke when its end butts up against plug 4.

All parts are now located as shown in Fig. 1. The divisional feeder is now ready to repeat the cycle of operations above described as many times as may be desired and dependent only upon the continued supply of lubricant under suitable pressure to the inlet port 5. The function of the cylindrical stop 29 in conjunction with the grooves 10 and 11 and enlarged hub 9, of piston rod 6 and with the grooves 18 and 19 and the enlarged hub 17, of piston rod 7, is to prevent either one of the piston rods 6 or 7, when once in motion, from stopping before reaching the end of its stroke. In case one of the piston rods should stop in the middle of its stroke due to the interruption of the supply of lubricant under pressure, the cylindrical stop 29 will prevent the other piston from moving, when the supply of lubricant is renewed, until the first piston has completed its stroke.

Having thus fully described my invention, it is understood that I do not limit myself to the embodiment shown.

I claim:

1. A feeder for dividing and distributing fluids comprising a body-member having a pair of cylinders formed therein, a central passage connecting said cylinders intermediate their ends, an inlet port in one of said cylinders, two discharge ports in each cylinder, one on each side of said central passage, two pairs of passages connecting the said cylinders, each of said last named passages leading from one end of one cylinder to a point adjacent the entrance of the central passage in the other cylinder and between said central passage and a discharge port, the respective points of entry of the first pair of passages from the ends of the first cylinder extending beyond the opening of the central passage in the second cylinder, and the respective points of entry of the second pair of passages from the ends of the second cylinder being on the respective sides of the opening of the central passage therein nearest the end of the cylinder from which they lead, a reciprocating piston rod in each cylinder, and four substantially equally spaced-apart piston-type valves on each piston rod, the spacing of said valves on each rod controlling the flow of fluid through the feeder, permitting flow of fluid under pressure entering the first cylinder through the inlet port and entering into the second cylinder through the central passage to pass from the second cylinder into the first cylinder, alternately through the first pair of passages to one end of the first cylinder, while the other of the first pair of passages is in communication with a discharge port in the second cylinder, the piston type valves on the piston rod in the first cylinder alternately establishing communication between the inlet and second pair of passages at respective ends of the stroke of said piston rod and simultaneously establishing communication between a discharge port in the first cylinder and the other of the second pair of passages, each of the passages of said first and second pair acting at one time as an inlet port to a cylinder end permitting fluid to shift the piston rod in its respective cylinder to the opposite end and to hold it there until the piston in the other cylinder shifts and, on the return stroke of the piston, acting as a discharge passage for the fluid in front of the piston rod discharging the fluid to a discharge port in the other cylinder.

2. A feeder for dividing and distributing fluids comprising a body-member having a pair of cylinders formed therein, a central passage connecting said cylinders intermediate their ends, an inlet port in one of said cylinders, two discharge ports in each cylinder, one on each side of said central passage, two pairs of passages connecting the said cylinders, each of said last named passages leading from one end of one cylinder to a point adjacent the entrance of the central passage in the other cylinder and between said central passage and a discharge port, the respective points of entry of the first pair of passages from the ends of the first cylinder extending beyond the opening of the central passage in the second cylinder, and the respective points of entry of the second pair of passages from the ends of the second cylinder being on the respective sides of the opening of the central passage therein nearest the end of the cylinder from which they lead, a reciprocating piston rod in each cylinder, four substantially equally spaced-apart piston-type valves on each piston rod, said valves controlling the flow of fluid through the feeder, permitting flow of fluid under pressure entering the first cylinder through the inlet port and entering into the second cylinder through the central passage to pass from the second cylinder into the first cylinder, alternately through the first pair of passages to one end of the first cylinder, while the other of the first pair of passages is in communication with a discharge port in the second cylinder, the piston type valves on the piston rod in the first cylinder alternately establishing communication between the inlet and second pair of passages at respective ends of the stroke of said piston rod and simultaneously establishing communication between a discharge port in the first cylinder and the other of the second pair of passages, each of the passages of said first and second pair acting at one time as an inlet port to a cylinder end permitting fluid to shift the piston rod in its respective cylinder to the opposite end and to hold it there until the piston in the other cylinder shifts and, on the return stroke of the piston, acting as a discharge passage for the fluid in front of the piston rod discharging the fluid to a discharge port in the other cylinder, and means for preventing movement of both piston rods at the same time.

3. A feeder for dividing and distributing fluids comprising a body-member having a pair of cylinders formed therein, a central passage connecting said cylinders intermediate their ends, an inlet port in one of said cylinders, two discharged ports in each cylinder, one on each side of said central passage, two pairs of passages connecting the said cylinders, each of said last named passages leading from one end of one cylinder to a point adjacent the entrance of the central passage in the other cylinder and between said central passage and a discharge port, the respective points of entry of the first pair of passages from the ends of the first cylinder extending beyond the opening of the central passage in the second cylinder, and the respective points of entry of the second pair of passages from the ends of the second cylinder being on the respective sides of the opening of the central passage therein nearest the end of the cylinder from which they lead, a reciprocating piston rod in each cylinder, four substantially equally spaced-apart piston-type valves on each piston rod, the spacing of said valves on each rod controlling the flow of fluid through the feeder, permitting flow of fluid under pressure entering the first cylinder through the inlet port and entering into the second cylinder through the central passage to pass from the second cylinder into the first cylinder, alternately through the first pair of passages to one end of the first cylinder, while the other of the first pair of passages is in communication with a discharge port in the second cylinder, the piston type valves on the piston rod in the first cylinder alternately establishing communication between the inlet and second pair of passages at respective ends of the stroke of said piston rod and simultaneously establishing communication between a discharge port in the first cylinder and the other of the second pair of passages, each of the passages of said first and second pair acting at one time as an inlet port to a cylinder end permitting fluid to shift the piston rod in its respective cylinder to the opposite end and to hold it there until the piston in the other cylinder shifts and, on the return stroke of the piston, acting as a discharge passage for the fluid in front of the piston rod discharging the fluid to a discharge port in the other cylinder, an enlarged hub at the center of each piston rod, two circumferential grooves on each piston rod, one on each side of said hubs, and a member mounted to reciprocate in said central passage without stopping flow of fluid therethrough and having a length sufficient to prevent movement of both of said piston rods at the same time.

DAVID R. HILLIS.